(12) United States Patent
Chapman (10) Patent No.: US 12,050,817 B1
(45) Date of Patent: Jul. 30, 2024

(54) METHOD AND SYSTEM FOR RENDERING PRE-TRAPPED TEXT

(71) Applicant: Xerox Corporation, Norwalk, CT (US)

(72) Inventor: Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 18/209,133

(22) Filed: Jun. 13, 2023

(51) Int. Cl.
*H04N 1/32* (2006.01)
*G06F 3/12* (2006.01)
*H04N 1/00* (2006.01)

(52) U.S. Cl.
CPC .......... *G06F 3/1208* (2013.01); *G06F 3/1222* (2013.01); *G06F 3/1234* (2013.01); *H04N 1/00087* (2013.01)

(58) Field of Classification Search
CPC .... G06F 3/1208; G06F 3/1222; G06F 3/1234; G06F 3/1244; H04N 1/00087; H04N 1/32144
USPC .................................. 358/1.2, 3.28
See application file for complete search history.

(56) References Cited

U.S. PATENT DOCUMENTS

| | | | |
|---|---|---|---|
| 7,965,422 B2 | 6/2011 | Hains et al. | |
| 8,156,416 B2 | 4/2012 | St. Jacques, Jr. et al. | |
| 8,199,359 B2 | 6/2012 | Gandhi et al. | |
| 8,437,013 B2 | 5/2013 | Eschbach et al. | |
| 9,118,870 B2 | 8/2015 | Chapman | |
| 10,795,618 B2 | 10/2020 | Gutierrez et al. | |
| 2007/0024915 A1* | 2/2007 | Simske | B42D 25/29 358/3.28 |
| 2017/0043609 A1* | 2/2017 | Lister | B42D 25/342 |
| 2017/0228620 A1* | 8/2017 | Chapman | H04N 1/2315 |
| 2020/0336623 A1* | 10/2020 | Chapman | G06T 1/0021 |

OTHER PUBLICATIONS

"Fraud-Resistant Effects That Protect Your Most Sensitive Documents," 2019 Xerox Corporation.
"Xerox® Specialty Imaging: Fraud Deterrent Technology," https://www.xerox.com/en-us/digital-printing/fraud-deterrent-technology, 2023 Xerox Corporation.
"Thriving in the Era of Digital Transformation," 2017 Xerox Corporation.
"XMPie® Variable Data Printing Solutions," https://www.xerox.com/en-bd/digital-printing/workflow/xmpie-variable-data-printing-solutions, 2023 Xerox Corporation.

* cited by examiner

*Primary Examiner* — Kent Yip
(74) *Attorney, Agent, or Firm* — Ortiz & Lopez, PLLC; Kermit D. Lopez; Luis M. Ortiz (57) ABSTRACT

Methods and systems for generating pre-trapped text, can involve providing a color comprising two or more inks, writing a character of microtext in a normal position using one or more of the inks, writing the character n more times in the color at new positions, and then altering the color and writing the character in microtext in the normal position. The resulting microtext can be rendered on a recording medium with a printing system.

20 Claims, 9 Drawing Sheets

METHOD AND SYSTEM FOR RENDERING PRE-TRAPPED TEXT

TECHNICAL FIELD

Embodiments are related to image processing methods, systems and devices. Embodiments also relate to printing devices and techniques. Embodiments further relate to methods, devices, and systems for rendering pre-trapped text.

BACKGROUND

In conventional printing processes that require security measures, specialty imaging can be used to provide security measures and assist in preventing the counterfeiting of printed materials. A pattern color space having specialty imaging characteristics can be used to provide such security measures. In addition, in conventional printing processes, a pattern color space has been utilized, in part on variable data, such as printing logos, serial numbers, seat locations, or other types of unique identifying information on printed materials.

In security applications, it is desirable to add information to a document that prevents or hinders alterations and counterfeiting. These security elements may conflict with the overall aesthetics of the document. Information regarding specialty imaging including infrared mark text and ultra violet mark text can be found at this webpage: https://www.xerox.com/en-us/digital-printing/secure-printing, which is incorporated herein by reference in its entirety.

Specialty imaging has been used, conventionally, in printed materials to provide fraud protection and anti-counterfeiting measures. Some examples are in prescriptions, contracts, documents, coupons, and tickets. Typically, several specialty imaging techniques may be used at various positions in a document. However, specialty imaging text techniques take up space in the document.

One specialty imaging to address the issue of real estate or space in media such as a document involves specialty imaging microtext, which is a well-known security printing product. When printing color text (e.g., red or green), however, registration errors may ruin the small text offered by the specialty imaging product. One solution for addressing these issues involves trapping, which involves a technique that can compensate for misalignment or registration errors that can occur when overlaying textual information on top of medical images. This technique may be employed where accurate alignment of text labels with specific structures may be crucial.

Registration errors can occur due to various factors, such as differences in image acquisition devices, motion, or image processing algorithms. These errors can cause misalignment between the actual structures in an image and corresponding text labels, which can lead to confusion or misinterpretation. Registration errors refer to inaccuracies or misalignments that may occur when attempting to align or overlay multiple images or data sets. These errors can occur in various fields, including imaging, computer vision, remote sensing, and imaging processing including graphics processing.

Trapping is a process that involves modifying the appearance of, for example text to minimize the visual impact of registration errors. The main idea is to expand the boundaries of the text by adding a small border or halo around each character of the text. By doing so, even if the text and an underlying image are not perfectly aligned, the added border compensates for any misalignment and ensures that the text remains visually connected to the intended anatomical structures.

The trapping technique typically involves algorithms or software tools that automatically analyze the image and detect areas where text labels are present. These tools then apply the trapping effect to the detected text, adding the necessary borders or halos around each character. The size and color of the border are usually adjusted to ensure optimal visibility without obstructing the underlying image details.

By employing trapping, registration errors can be mitigated, enhancing the accuracy and clarity of the images. This technique can facilitate the accurate interpretation of images and identification of corresponding structures. While trapping is a well-known solution for addressing registration errors, it is not available across all rendering devices or systems (e.g., printing systems) and even if it is available may not work on a single object.

Figure 1:
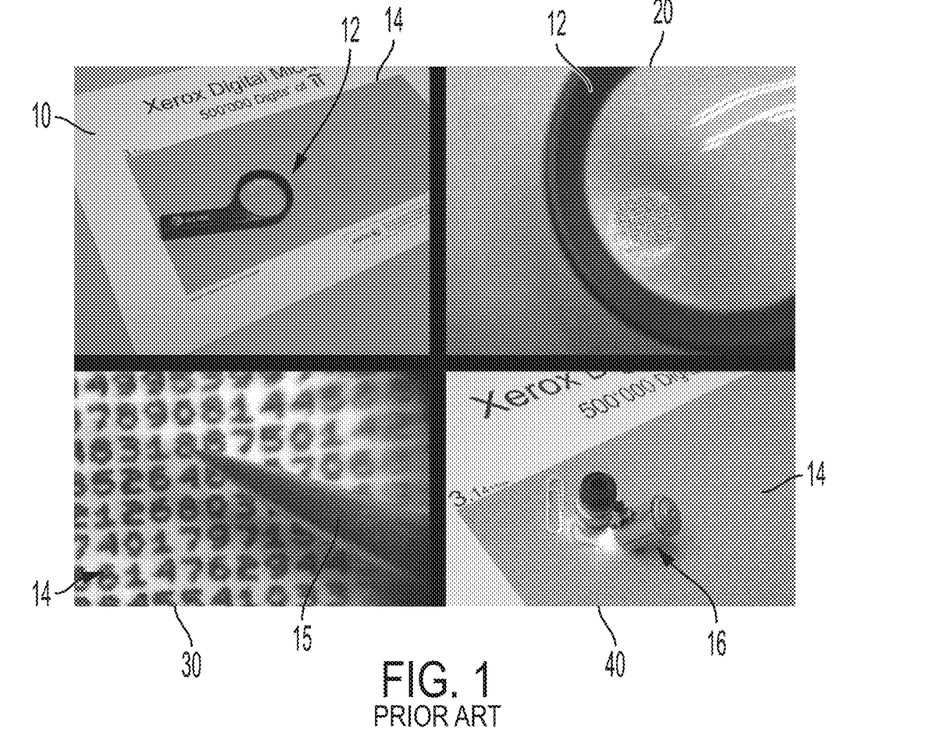
FIG. 1 illustrates a group of images depicting various magnifications of a loupe with respect to microtext.

FIG. 1 illustrates a group of images 10, 20, 30, and 40 depicting various magnifications of microtext 14 with and without a loupe 12, in accordance with an embodiment. FIG. 1 thus depicts examples of specialty imaging effects that are difficult to read. Microtext 14 is shown in pictorial view 10 rendered on a document but may only be viewed with magnification such as the loupe 12 shown in images 10, 20 and 30.

Note that a loupe is a small magnification device that can be used to see small details more closely. Loupes generally have higher magnification than a magnifying glass and are designed to be held or worn close to the eye. Note that a microscope can also work in place of such loupes. Any device that allows for magnification such as a loupe, microscope, etc. can be used to review the microtext 14. In image 40, for example, a compact magnification device 16 is shown which can be used to view the details of the microtext 14. Image 30 shows the details of the microtext 14 with respect to the tip of a fine pointing device 15.

Microtext such as microtext 14 generally works well across various product lines with the exception of some low-resolution devices. Unless color-to-color registration is near perfect, printing microtext composed of two or more base (CMYK+spots) colors is problematic. This can be due to the tiny size of 6-9 pixels high for each character A ¼ pixel registration error may be difficult to read without magnification.

Some production printers can support trapping, which may be helpful for this case. A disadvantage to this approach is that trapping can break other specialty imaging effects such as fluorescent and infrared text. Many other products imply do not support trapping.

Figure 2:
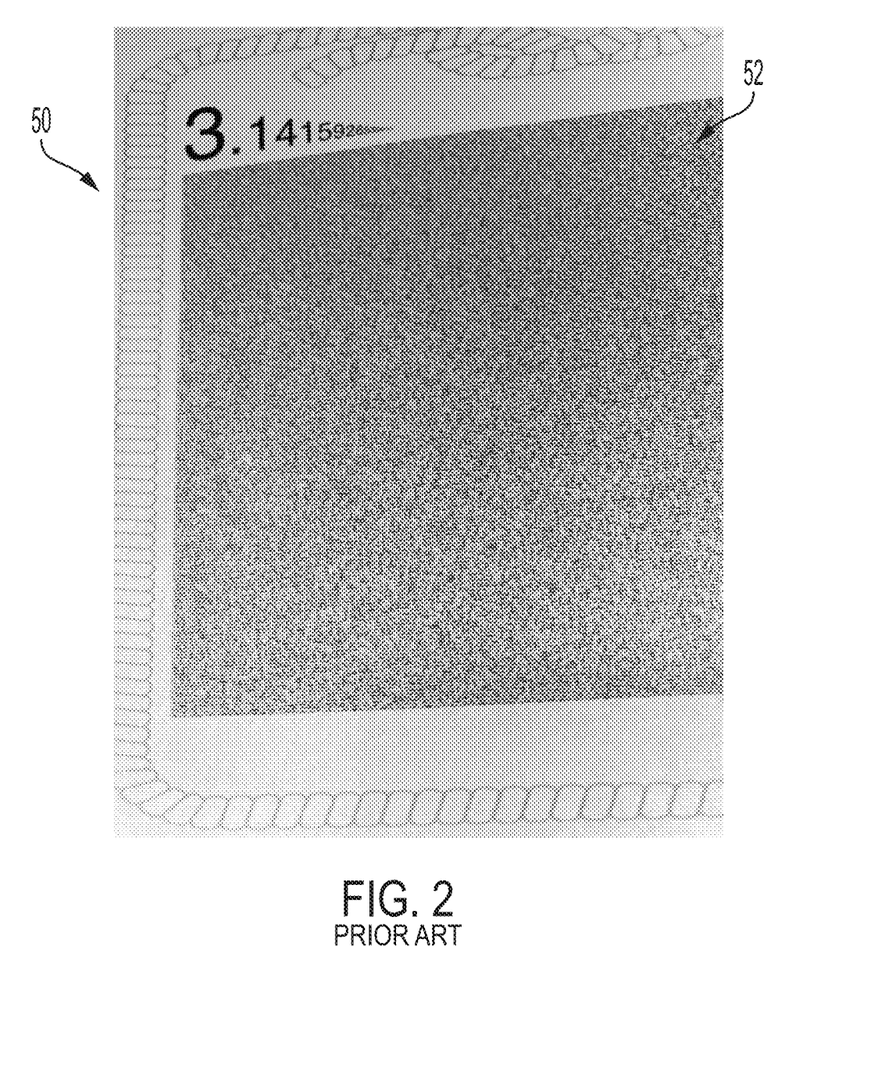
FIG. 2 illustrates an image depicting an example of color microtext.
Figure 3:
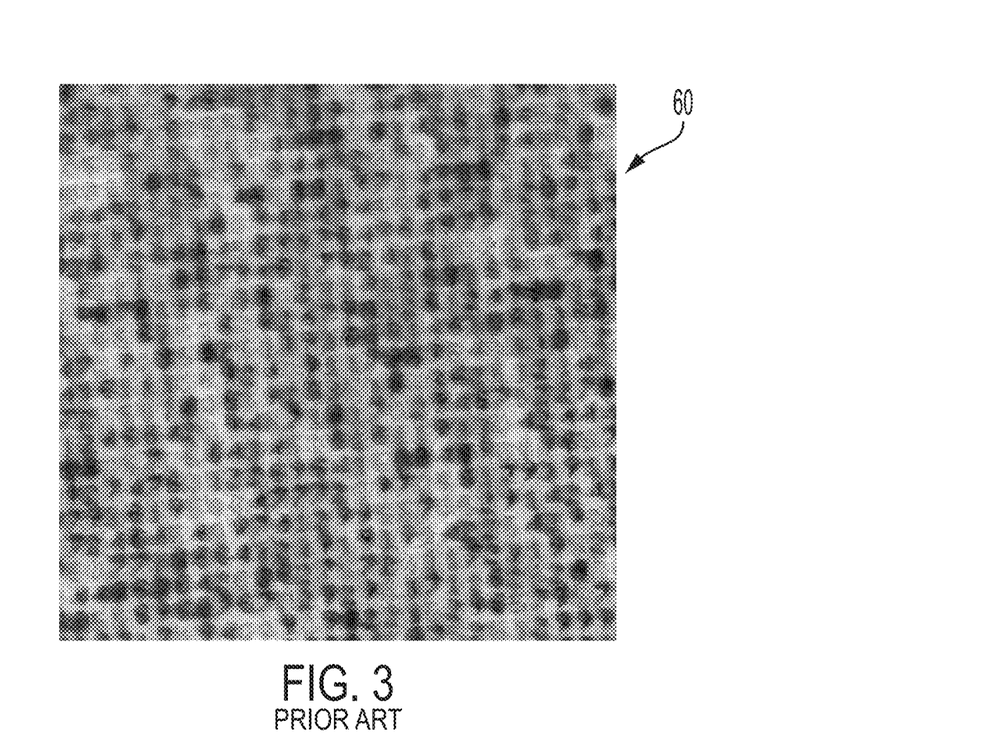
FIG. 3 illustrates an image depicting a zoomed view of the color microtext shown in FIG. 2.

FIG. 2 illustrates an image 50 depicting an example of color microtext 52. FIG. 3 illustrates an image 60 depicting a zoomed view of the color microtext 52 shown in FIG. 2. The image 60 shown in FIG. 2 shows 100000 places of Pi in color microtext. The zoomed view in of the color microtext 52 as shown in image 60 in FIG. 3 demonstrates how microtext composed of multiple primary or spot colors can start to expand out and become unreadable (e.g., red, and green).

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the embodiments to provide for improved image-processing methods, systems, and devices.

It is another aspect of the embodiments to provide for methods, systems and devices for pre-trapping text.

It is a further aspect of the embodiments to provide a solution for addressing errors in printing microtext in color caused by color misregistration between color layers.

The aforementioned aspects and other objectives and advantages can now be achieved as described herein. In an embodiment, a method for generating pre-trapped text, can involve: providing a color comprising at least two inks writing a character of microtext in a normal position using at least one of the at least two inks; writing the character n more times in the color at new positions; and altering the color and writing the character in microtext in the normal position. The resulting or generated microtext can be rendered on a recording medium (e.g., a document, a substrate, etc.) by a printing system.

An embodiment can further involve performing a color calibration of the color.

An embodiment can also involve performing a color calibration of the color prior to writing the character of microtext in the normal position using the at least one of the at least two inks.

An embodiment can further involve measuring a color-to-color registration error after performing a color calibration.

An embodiment can involve remeasuring the color-to-color registration error after a period of time.

An embodiment can involve measuring a color-to-color registration error after performing a color calibration and prior to writing the character of microtext in the normal position using the at least one of the at least two inks.

In an embodiment, a system for rendering pre-trapped text on a recording medium, can include a processor and a computer-readable medium containing programming instructions that are configured to cause the processor to: provide a color comprising at least two inks; write a character of microtext in a normal position using at least one of the at least two inks write the character n more times in the color at new positions; and alter the color and writing the character in microtext in the normal position.

In an embodiment, a printing system can include a print device; a processor; and a computer-readable medium containing programming instructions that are configured to cause the processor to: provide a color comprising at least two inks; write a character of microtext in a normal position using at least one of the at least two inks write the character n more times in the color at new positions; alter the color and write the character in microtext in the normal position; an cause the print device to render the microtext on a recording medium.

BRIEF DESCRIPTION OF THE DRAWINGS

The accompanying FIGURES, in which like reference numerals refer to identical or functionally similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Furthermore, the term "at least one" as utilized herein can refer to "one or more". For example, "at least one widget" may refer to "one or more widgets."

The term "data" refers herein to physical signals that indicate or include information. An "image," as a pattern of physical light or a collection of data representing the physical light, may include characters, words, and text as well as other features such as graphics.

A "digital image" can be by extension an image represented by a collection of digital data. An image may be divided into "segments," each of which is itself an image. A segment of an image may be of any size up to and including the whole image. The term "image object" or "object" as used herein is believed to be considered in the art generally equivalent to the term "segment" and will be employed herein interchangeably.

In a digital image composed of data representing physical light, each element of data may be called a "pixel," which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. An operation can perform "image processing" when it operates on an item of data that relates to part of an image.

The term L*a*b (also referred to as Lab or LAB) as utilized herein relates to the CIELAB color space (L*a*b), which is a color space defined by the International Commission on Illumination (CIE). L*a*b It expresses color as three values: L* for perceptual lightness and a* and b* for the four unique colors of human vision: red, green, blue and yellow. CIELAB was intended as a perceptually uniform space, where a given numerical change corresponds to a similar perceived change in color. While the LAB space is not truly perceptually uniform, it nevertheless is useful in industry for detecting small differences in color.

The term CMYK as utilized herein relates to the CMYI color model, wherein CYMK refers to the four ink plates used: cyan, magenta, yellow, and key (black). The CMYK model works by partially or entirely masking colors on a lighter, usually white, background. The ink reduces the light that would otherwise be reflected. Such a model is considered subtractive because inks "subtract" the colors red, green and blue from white light. White light minus red leaves cyan, white light minus green leaves magenta, and white light minus blue leaves yellow. An example of an additive color model is the RGB color model in which the red, green, and blue primary colors of light are added together to reproduce a broad array of colors. "RGB" relates to the three primary colors, red, green and blue. RGB (i.e., the RGB color model) can be used for sensing, representation, and display of images in electronic systems, such as televisions and computers.

The term "watermark" as utilized herein can relate to a piece of a transparent text, image, logo or other markings that can be applied to media (e.g., a document, paper, a photo, an image, etc.), which can make it more difficult to copy or counterfeit the media (to which the watermark is applied through security printing) or use it without permission. A "watermark" can be a special-purpose text or picture that can be printed across one or more pages. For example, one can add a word like Copy, Draft, or Confidential as a watermark instead of stamping it on a document before distribution.

The methodology below can be implemented to address the problems outlined in the background section of this disclosure:
1) Perform a color calibration if available;
2) Measure the color-to-color registration error;
3) Remeasure after a period of time;
4) Copy a microfont file (e.g., micro_f7) and rename (e.g., to micro_f7_green);
5) For one component of green e.g., yellow write a character, move rewrite the character (repeat until all probable registration errors are accounted for based on steps 1-3);
6) For the second component of green e.g., cyan write the character once in the original location; and
7) Repeat steps 4-6 for each desired color.

The above approach can take advantage of some rarely used features of microtext. The ability to change colors and write multiple times within a character in a font is not available in most font formats. The above methodology starts with a color composed of two more toners or inks (e.g., green composed of yellow and cyan), followed by writing of the character in its normal position (e.g., in yellow). Based on a registration error algorithm, the character can be written n more times in the same color at new positions. The colors can be then changed (e.g., to cyan) and an operation performed to write the character in its normal position.

Figure 4:
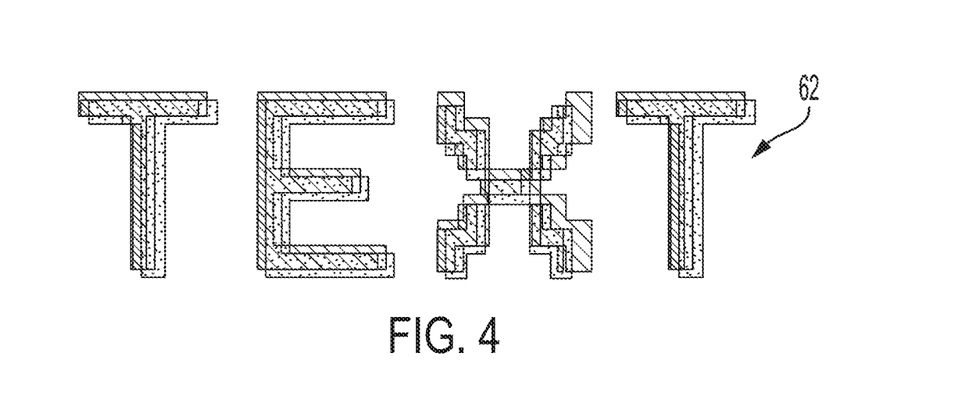
FIG. 4 illustrates example microtext of the word "TEXT" with a small registration error, in accordance with an embodiment.

FIG. 4 illustrates microtext 62 of the word "TEXT" with a small registration error, in accordance with an embodiment. It should be appreciated that FIGS. 2-4 depict a ½, ½, and 1 pixel error in color registration for both the x and y directions. Both the readability and desired color of green thus degrade as the error increases.

Figure 5:
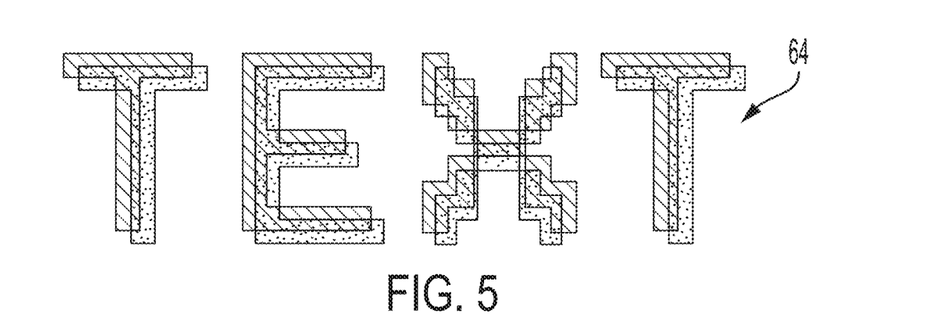
FIG. 5 illustrates microtext of the word "TEXT" with a medium registration error, in accordance with an embodiment.

FIG. 5 illustrates microtext 64 of the word "TEXT" with a medium registration error, in accordance with an embodiment. Note that the term 'microtext' as used herein can relate to extremely small text that is typically not visible to the naked eye without the aid of magnification. It is commonly used in various security and identification applications, such as banknotes, passports, identification cards, product labels, and other sensitive documents. A purpose of microtext is to provide a level of security and deter counterfeiting or unauthorized duplication.

Microtext can be characterized by its minuscule size, often requiring specialized equipment like magnifying lenses, microscopes, or optical readers to be read or detected. The text can be intentionally designed to be difficult to replicate accurately, making it an effective feature for enhancing document security.

Microtext may consist of letters, numbers, symbols, or patterns and is typically printed using high-resolution printing techniques. It can be incorporated within larger printed designs or hidden within other elements, such as illustrations or graphics, to make it more challenging to identify or reproduce.

The use of microtext serves as an additional layer of security in documents, providing a covert feature that can help verify authenticity, prevent forgery, or assist in document verification processes. Its small size and often complex design make it highly resistant to reproduction using standard printing or copying methods, contributing to its effectiveness in security applications.

Figure 6:
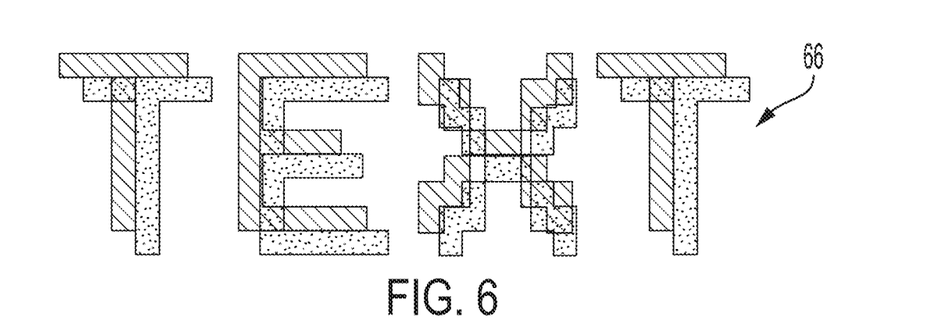
FIG. 6 illustrates microtext of the word "TEXT" with a large registration error, in accordance with an embodiment.

FIG. 6 illustrates microtext 66 of the word "TEXT" with a large registration error, in accordance with an embodiment.

Figure 7:
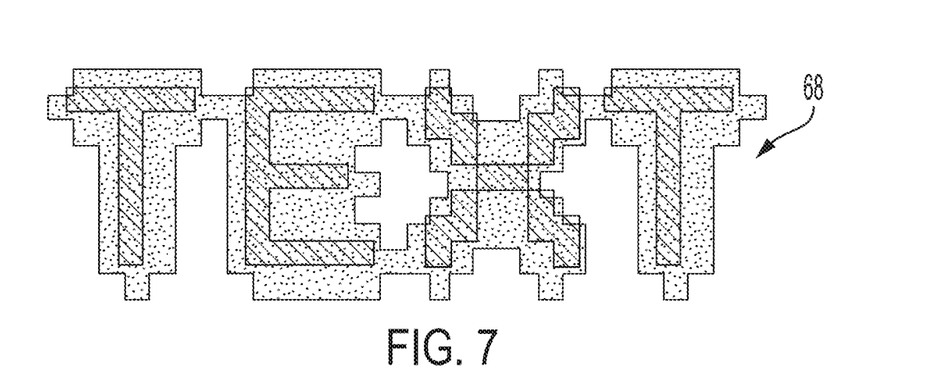
FIG. 7 illustrates microtext of the word "TEXT" with registration error trapped, in accordance with an embodiment.

FIG. 7 illustrates microtext 68 of the word "TEXT" with registration error trapped, in accordance with an embodiment.

Figure 8:
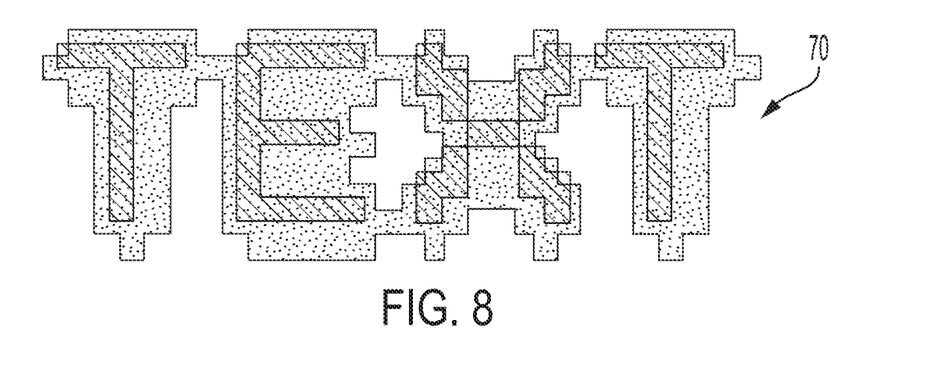
FIG. 8 illustrates microtext of the word "TEXT" also with the registration error trapped, in accordance with an embodiment.

FIG. 8 illustrates microtext 70 of the word "TEXT" also with the registration error trapped, in accordance with an embodiment.

Figure 9:
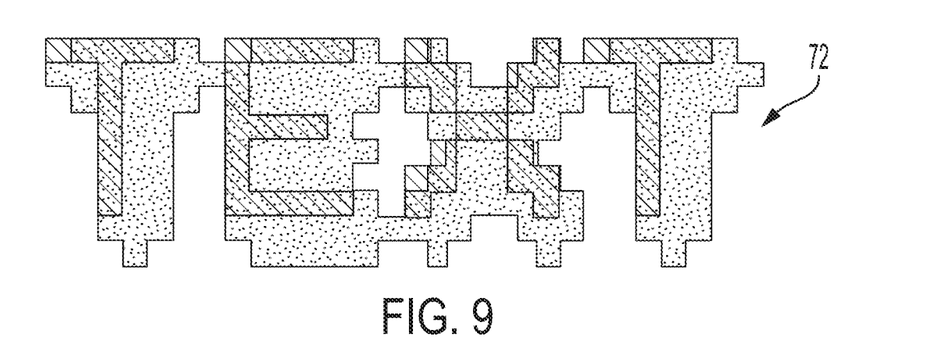
FIG. 9 illustrates microtext of the word "TEXT" with the registration error trapped, in accordance with an embodiment.

FIG. 9 illustrates microtext 72 of the word "TEXT" with the registration error trapped, in accordance with an embodiment.

FIGS. 5-7 depicted the pre-trapped version of the microtext shown in FIGS. 2-4. The algorithm used here may assume a color could drift up or down and left or right a full pixel each. A simpler version (e.g., cyan) may only drift one pixel to the right, which means that each yellow character can be written twice.

Figure 10:
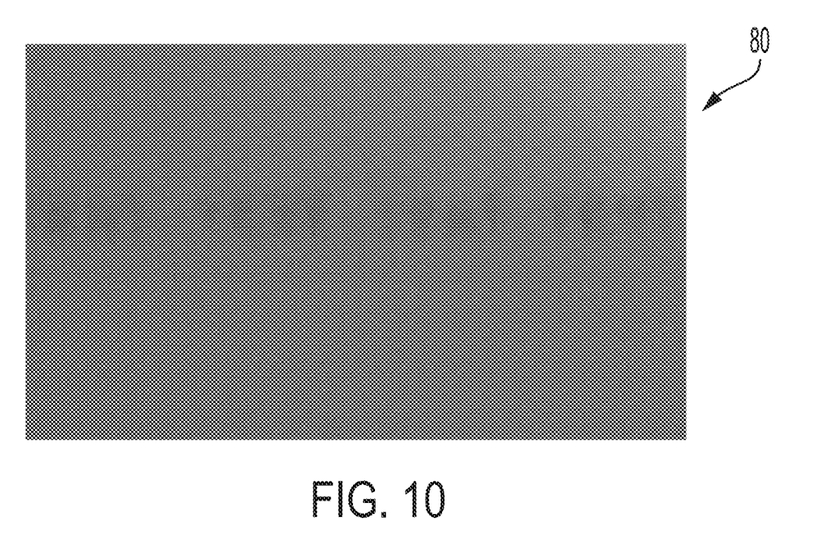
FIG. 10 illustrates an image showing untrapped microtext, in accordance with an embodiment.
Figure 11:
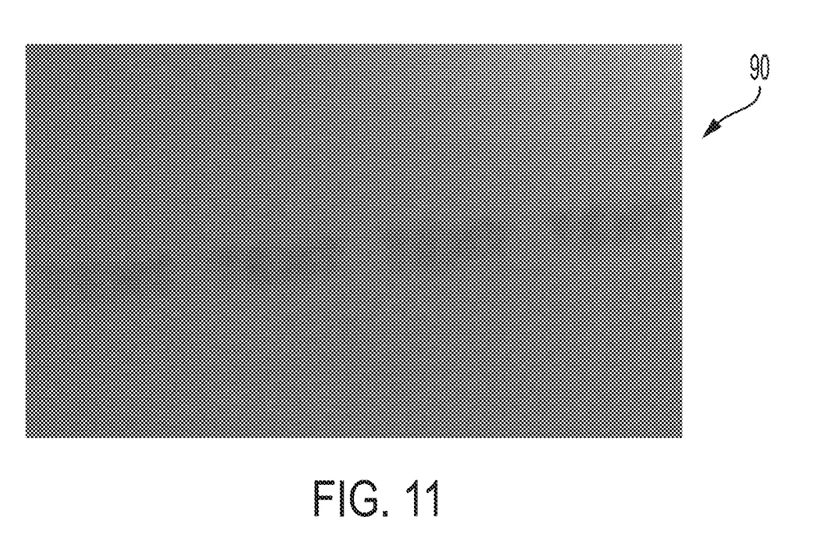
FIG. 11 illustrates an image showing trapped microtext, in accordance with an embodiment.

FIG. 10 illustrates an image 80 showing untrapped microtext, in accordance with an embodiment. FIG. 11 illustrates an image 90 showing trapped microtext, in accordance with an embodiment. FIGS. 10-11 show the difference the pre-trapped text makes when viewed in a loupe such as described previously. These FIGURES may need the zoom level adjusted in order for a viewer to see the difference. The trapped text is much easier to read as compared to the un-trapped text.

Note that when a registration error is "trapped" in text, this means that the error may be intentionally incorporated or accounted for within the text itself, typically in a way that minimizes its visibility or impact. This technique may be employed in printing processes to mitigate the effects of color mis-registration between different color layers. In the context of printing microtext in color, where color mis-registration can lead to errors or distortions in the printed output, trapping the registration error in text can involve specific steps to compensate for the misregistration. These steps may include manipulating the microfont file and applying specific printing techniques.

By following the method described herein, which involves color calibration, measurement of registration errors, and iterative rewriting of characters based on the detected errors, a goal is to align the different color layers as accurately as possible. This alignment can help reduce the visual impact of the registration errors within the micro text, making them less noticeable or invisible to the naked eye.

Trapping the registration error in text can ensure that the final printed output appears as intended, despite the inherent challenges associated with color mis-registration. This can allow for a more accurate and visually pleasing representation of the micro text by compensating for the errors caused by misaligned color layers.

Figure 12:
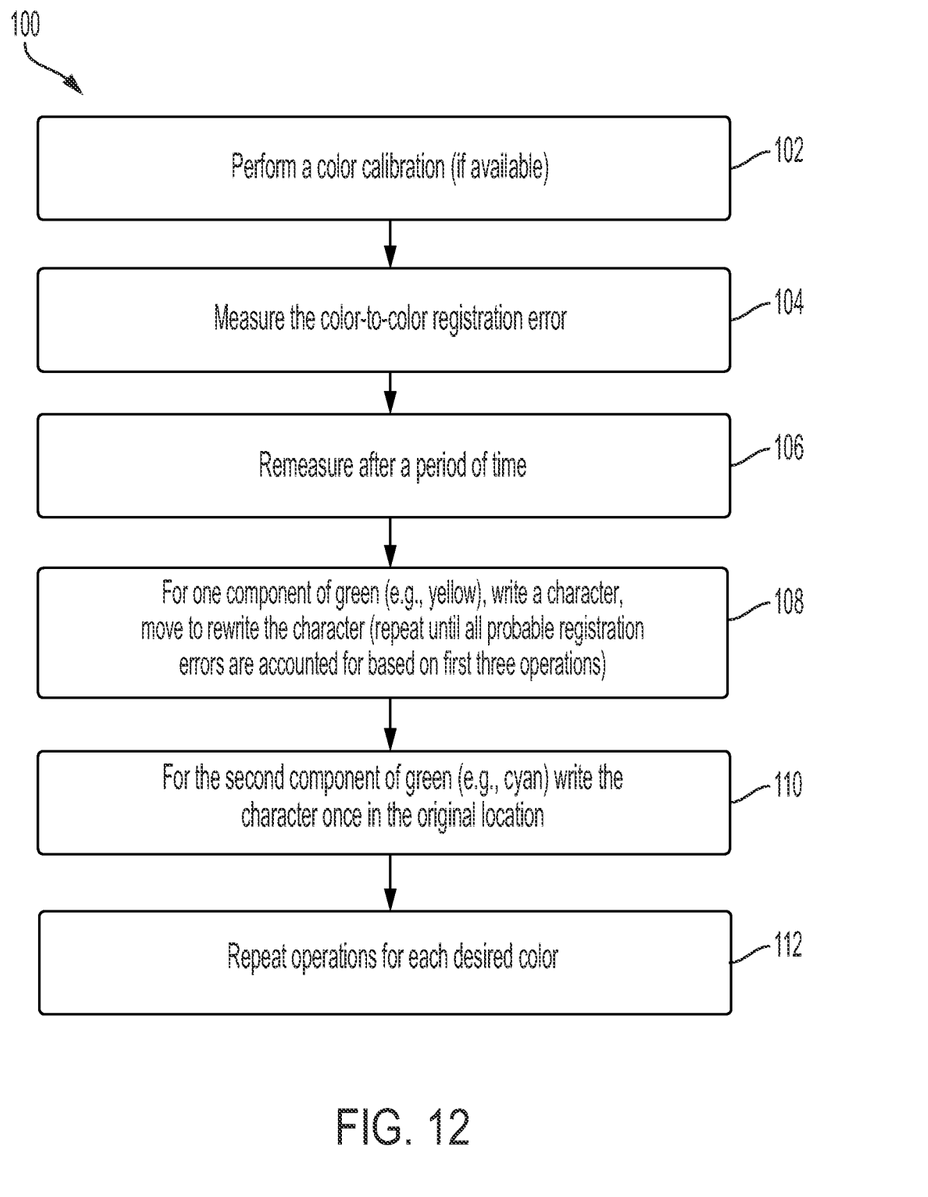
FIG. 12 illustrates a high-level flow chart of operation depicting logical operational steps of a method for pre-trapping text, in accordance with an embodiment.

FIG. 12 illustrates a high-level flow chart of operation depicting logical operational steps of a method 100 for pre-trapping text, in accordance with an embodiment. As shown at block 102, a step or operation can be implemented to perform a color calibration (if available). Next, as depicted at block 104, a step or operation can be implemented to measure the color-to-color registration error. Then, as shown at block 106, a step or operation can be implemented to remeasure the color-to-color registration error after a period of time. Thereafter, as shown at block 108, a step or operation can be implemented to copy a microfont file (e.g., micro_f7) and rename the file (e.g., to micro_f7_green).

Next, as indicated at block 110, a step or operation can be implemented for one component of green (e.g., yellow) to write a character, and then move to rewrite the character (note: repeat until all probable registration errors are accounted for based on the operations performed with respect to blocks 102, 104, and 106). Thereafter, as depicted at block 112, a step or operation can be implemented for the second component of green (e.g., cyan), to write the character once in the original location. Then, as depicted at block 114, the steps or operations of blocks 108, 110, and 112 can be repeated for each desired color.

Note that the operation of measuring the color-to-color registration error described above with respect to block 104 in FIG. 13 can be performed using specialized equipment and software designed for color calibration and registration analysis such as used in the printing industry. The process may involve operations such as color calibration, the use of test patterns or registration marks, measurement devices, software analysis, error quantification, iterative adjustment and so on. These features are described in more detail below.

Color Calibration: Before measuring the registration error, a color calibration procedure may be typically performed. This calibration can ensure that the printing system is properly aligned and calibrated to achieve accurate color reproduction. Color calibration can involve adjusting color settings, ink densities, and other parameters to ensure consistency and alignment between different color channels.

Test Patterns or Registration Marks: Test patterns or registration marks are printed on the media or substrate being used. These patterns consist of specific geometric shapes or targets that provide reference points for measuring registration errors. The marks are typically printed in each color channel being analyzed.

Measurement Devices: Specialized devices such as spectrophotometers or color densitometers may be used in some embodiments to measure the registration error provided they can measure at a sub-pixel level. These devices may be used analyze the printed test patterns or registration marks and provide precise measurements of color alignment and misregistration between different color layers. As discussed previously, a microscope can work with the embodiments.

Software Analysis: The measurement data obtained from the registration marks can be then processed and analyzed using dedicated software. Such software can compare the desired color alignment with the actual measured positions and calculates the registration error for each color component.

Error Quantification: The registration error can be quantified in terms of distance or offset between the desired and actual positions of the registration marks. This may be expressed in units such as micrometers or fractions of a pixel.

Iterative Adjustment: Based on the measured registration error, adjustments can be made to the printing system or color registration settings. This iterative process involves fine-tuning the alignment and repeating the measurement steps until satisfactory registration accuracy is achieved.

The specific methods and tools, which may be used for measuring color-to-color registration errors, may vary depending on the printing technology and equipment being employed.

Figure 13:
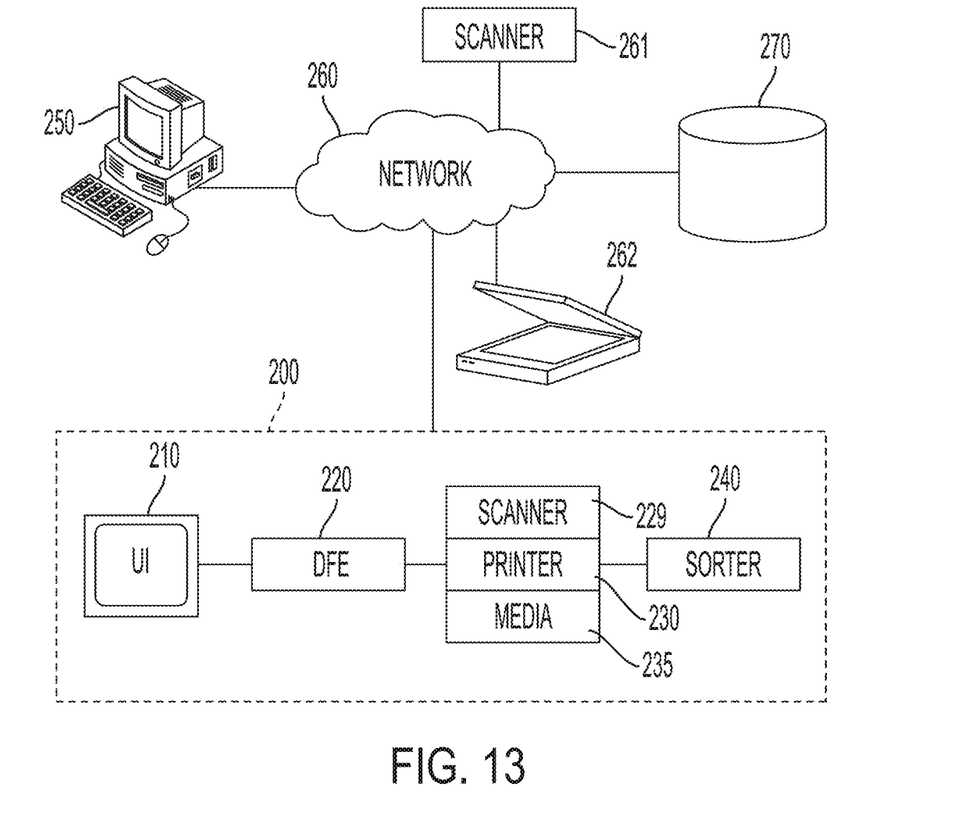
FIG. 13 illustrates a block diagram of a printing system suitable for implementing one or more of the disclosed embodiments.
Figure 14:
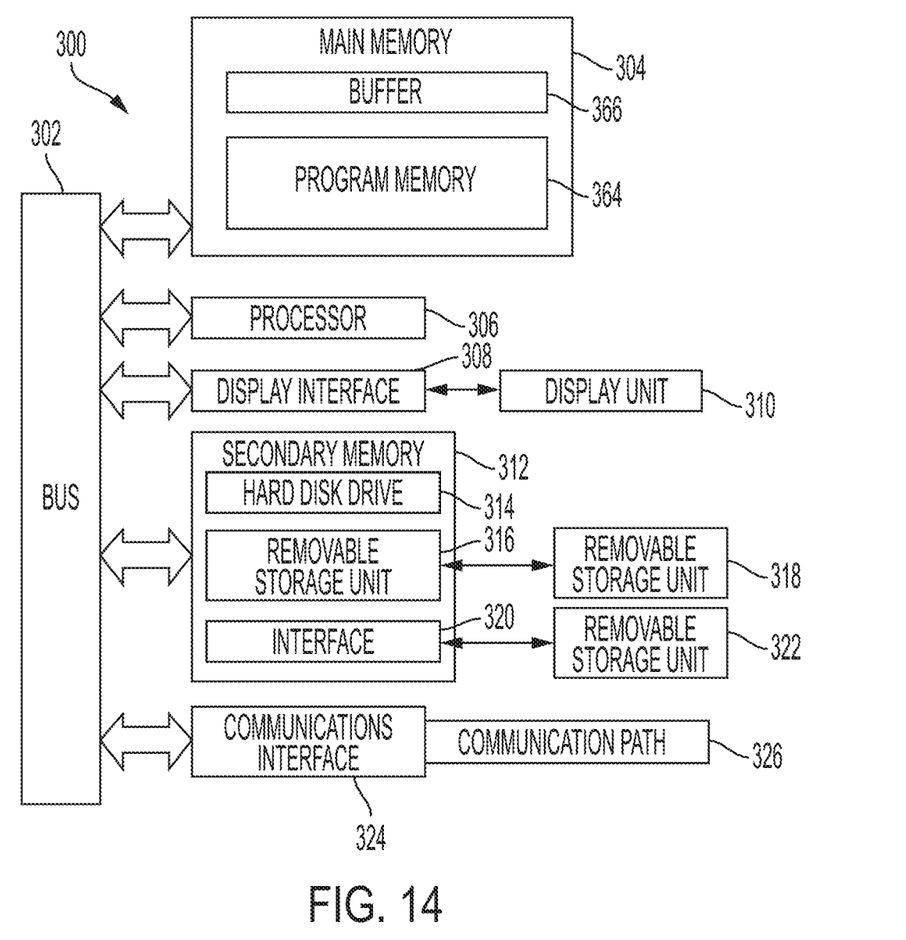
FIG. 14 illustrates a block diagram of a digital front-end controller useful for implementing one or more of the disclosed embodiments.

FIG. 13 illustrates a block diagram of a printing system 200 suitable for implementing one or more of the disclosed embodiments. FIG. 14 illustrates a block diagram of a digital front-end 300 useful for implementing one or more of the disclosed embodiments. The printing system 200 and/or the digital front-end 300 can be used to render (e.g., print) a recording medium (e.g., a document or substrate) with the pre-trapped text discussed herein. In some embodiments, the digital front-end 300 shown in FIG. 14 may be used to implement the digital front-end 220 shown in FIG. 13.

Note that the term 'character' as utilized herein can relate to characters of microtext, which can refer to the individual letters, numbers, symbols, or other graphical elements that make up the tiny text (i.e., microtext). These characters can be designed to be significantly smaller in size compared to standard text and are often not legible to the naked eye without the use of magnification.

The characters in microtext can be carefully crafted to be highly detailed, intricate, and difficult to reproduce accurately. They may incorporate various techniques to enhance their security features, such as using fine lines, complex shapes, or unique patterns. These design elements help make the microtext resistant to counterfeiting or unauthorized duplication.

Microtext characters can be printed using high-resolution printing methods, such as microprinting or specialized printing techniques that can achieve extremely small details. The printing system 200 and other components shown in FIG. 13 and the digital front-end 300 depicted in FIG. 14 may be used to print microtext including microtext characters. The characters may be arranged in lines, paragraphs, or as part of larger designs, and they are often strategically placed within documents to serve specific security purposes.

Note that in security applications, microtext characters can be used to add an additional layer of protection to sensitive documents, such as banknotes, passports, or identification cards. They can be hidden within specific areas, integrated into security features, or placed in inconspicuous locations, making them difficult to detect and replicate without proper equipment or techniques. Overall, microtext characters are an important component of microtext, providing covert and intricate elements that contribute to document security and authentication.

The term 'microfont file' as utilized herein can relate to a digital file that can contain the information and data necessary to define and generate microtext characters. It is a specialized font file specifically designed for microtext applications, where the characters are significantly smaller in size compared to standard text.

Microfont files typically contain a set of characters, including letters, numbers, symbols, and sometimes even customized graphical elements, specifically tailored for microtext representation. These characters are designed and optimized to be highly detailed and intricate, ensuring their legibility and reproducibility at small sizes.

A microfont file may include various data and instructions related to each character's shape, size, spacing, and positioning. The microfont file can provide the necessary information to accurately render the microtext characters during the printing or rendering process. This can involve fine details, curves, and features that are specific to microtext, allowing the characters to maintain their clarity and readability when printed or displayed at reduced sizes.

Microfont files are typically used in conjunction with appropriate software or printing systems that can interpret the font data and generate the microtext output. They may be proprietary formats specific to certain applications or can be based on standard font file formats such as, for example, TrueType (.ttf) or OpenType (.otf).

Microfont files can serve as a digital resource for creating and reproducing microtext characters with high precision and quality. They ensure that the intricate details of the microtext are preserved during the printing or rendering process, enabling the accurate representation of small-scale text in various security or identification applications.

With reference to FIG. 13, a printing system (or image rendering system) 200 suitable for implementing various aspects of the exemplary embodiments described herein is illustrated. The printing system 200 can implement rendering operations such as scanning a document via a scanner and printing a document via a printer, wherein the document includes the disclosed two-layer correlation mark with a variable data hiding layer.

The printing system 200 can be used to implement, for example, the method 100 discussed herein with respect to FIG. 12 and the methodology for pre-trapping text discussed earlier as well.

Note that the term 'scanner' as utilized herein may refer to an image scanner, which is a device or system that can optically scan images, printed text, handwriting or an object and converts it to a digital image. An example of a scanner is a flatbed scanner where the document to be imaged (e.g., a form) can be placed on a glass window for scanning. The scanner may in some cases be incorporated into a multi-function device (MFD), which also may possess printing and photocopying features. The scanner may also be incorporated into, for example, a printing system such as the printing system 200 shown in FIG. 13. For example, the scanner 229 is shown in FIG. 13 as a part of the printing system 200. Alternatively, or in addition to the scanner 229 included as a part of the printing system 200, a scanner 261 and/or a scanner 262 may communicate with the printing system 200 through the network 260.

The terms "printer," "print device," and "printing system" as used herein can be utilized interchangeably to refer to the same rendering device or system and can encompass any apparatus and/or system; such as a digital copier, xerographic and reprographic printing systems, bookmaking machine, facsimile machine, multifunction machine, ink-jet machine, continuous feed, sheet-fed printing device, etc.; which may contain a print controller and a print engine and which may perform a print outputting function for any purpose.

A "print device" or a "printing system" is an electronic device that is capable of receiving commands and/or data, and in response printing characters and/or images on a substrate. Printing devices may include, but are not limited to, network printers, production printers, copiers and other devices using ink or toner, and scanners. A print device may also perform a combination of functions such as printing and scanning, in which case such a device may be considered a multifunction device.

The printing system 200 can include a user interface 210, the digital front-end (DFE) 220, and one or more print engines such as a print engine 230. The print engine 230 may have access to print media 235 of various sizes and in some cases the cost for a print job. In some embodiments, the printing system 200 can comprise a color printer having multiple color marking materials.

A "print job" or "document" is normally a set of related sheets, usually one or more collated copy sets copied from a set of original print job sheets or electronic document page images, from a particular user, or otherwise related. For submission of a regular print job (or customer job), digital data can be sent to the printing system 200.

A sorter 240 can operate after a job is printed by the print engine 230 to manage arrangement of the hard copy output, including cutting functions. A user can access and operate the printing system 200 using the user interface 210 or via a data-processing system such as a workstation 250. The workstation 250 can communicate bidirectionally with the printing system 200 via a communications network 260.

A user profile, a work product for printing, a media library, and various print job parameters can be stored in a database or memory 270 accessible by the workstation 250 or the printing system 200 via the network 260, or such data can be directly accessed via the printing system 200. One or more color sensors (not shown) may be embedded in the printer paper path in some embodiments.

With respect to FIG. 14, an exemplary DFE (Digital Front End) 300 is shown in greater detail. The DFE 300 can include one or more processors, such as processor 306 capable of executing machine executable program instructions. The processor 306 can function as a DFE processor. The DFE shown in FIG. 14 may be utilized as or with the digital front end 220 of the printing system 200 shown in FIG. 23. Note that the term 'processor' as utilized herein can relate a component of an electronic device that executes programming instructions. The term "processor" may refer to either a single processor or to multiple processors that together implement various steps of a process. Unless the context specifically states that a single processor is required or that multiple processors are required, the term "processor" includes both the singular and plural embodiments.

In the embodiment shown, the processor 306 can be in communication with a bus 302 (e.g., a backplane interface bus, cross-over bar, or data network). The digital front end 300 can also include a main memory 304 that is used to store machine readable instructions. The main memory 304 is also capable of storing data. The main memory 304 may alternatively include random access memory (RAM) to support reprogramming and flexible data storage. A buffer 366 can be used to temporarily store data for access by the processor 306.

Program memory 364 can include, for example, executable programs that can implement the embodiments described herein. The program memory 364 can store at least a subset of the data contained in the buffer. The digital front end 300 can include a display interface 308 that can forward data from a communication bus 302 (or from a frame buffer not shown) to a display 310. The digital front end 300 can also include a secondary memory 312 that can include, for example, a hard disk drive 314 and/or a removable storage drive 316, which can read and write to removable storage 318, such as a floppy disk, magnetic tape, optical disk, etc., which can store computer software and/or data.

The secondary memory 312 alternatively may include other similar mechanisms for allowing computer programs or other instructions to be loaded into the computer system. Such mechanisms can include, for example, a removable storage unit 322 adapted to exchange data through interface 320. Examples of such mechanisms include a program cartridge and cartridge interface (such as that found in video game devices), a removable memory chip (such as an EPROM, or PROM) and associated socket, and other removable units and interfaces, which allow software and data to be transferred.

The digital front end (DFE) controller 300 can include a communications interface 324, which can act as an input and an output interface to allow software and data to be transferred between the digital front end controller 300 and external devices. Examples of a communications interface include a modem, a network interface (such as an Ethernet card), a communications port, a PCMCIA slot and card, etc.

Computer programs (also called computer control logic) and including one or more modules may be stored in the main memory 304 and/or the secondary memory 312. Computer programs or modules may also be received via a communications interface 324. Such computer programs or modules, when executed, can enable the computer system to perform the features and capabilities provided herein. Software and data transferred via the communications interface can be in the form of signals which may be, for example, electronic, electromagnetic, optical, or other signals capable of being received by a communications interface.

These signals can be provided to a communications interface via a communications path (i.e., channel), which carries signals and may be implemented using wire, cable, and fiber optic, phone line, cellular link, RF, or other communications channels.

Part of the data stored in secondary memory 312 for access during a DFE operation may be a set of translation tables that can convert an incoming color signal into a physical machine signal.

This color signal can be expressed either as a colorimetric value; usually three components as L*a*b*, RGB, XYZ, etc.; into physical exposure signals for the four toners cyan, magenta, yellow and black. These tables can be created outside of the DFE and downloaded but may be optionally created inside the DFE in a so-called characterization step. Part of the data stored in secondary memory 312 may also be the previously discussed transformation table.

Several aspects of data-processing systems will now be presented with reference to various systems and methods. These systems and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A mobile "app" is an example of such software.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer.

The disclosed example embodiments are described at least in part herein with reference to flowchart illustrations and/or block diagrams and/or schematic diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks.

To be clear, some embodiments may be implemented in the context of, for example a special-purpose computer or a general-purpose computer, or other programmable data processing apparatus or system. For example, in some example embodiments, a data processing apparatus or system can be implemented as a combination of a special-purpose computer and a general-purpose computer. The computer program product may include a computer readable storage medium (or media) having computer readable program instructions thereon for causing a processor to carry out aspects of the embodiments.

The aforementioned computer program instructions may also be stored in a computer-readable memory that can direct a computer or other programmable data processing apparatus to function in a particular manner, such that the instructions (e.g., steps/operations) stored in the computer-readable memory produce an article of manufacture including instruction means which implement the function/act specified in the various block or blocks, flowcharts, and other architecture illustrated and described herein. Examples of such instructions include the operations described in blocks 102, 104, 106, 108, 110, and 112 of the method 100 shown in FIG. 12.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flow charts and block diagrams in the FIGURES illustrate the architecture, functionality, and operation of possible implementations of systems, methods, and computer program products according to various embodiments (e.g., preferred or alternative embodiments). In this regard, each block in the flow chart or block diagrams depicted and described herein can represent a module, segment, or portion of instructions, which can comprise one or more executable instructions for implementing the specified logical function(s).

In some alternative implementations, the functions noted in the blocks may occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The functionalities described herein may be implemented entirely and non-abstractly as physical hardware, entirely as physical non-abstract software (including firmware, resident software, micro-code, etc.) or combining non-abstract software and hardware implementations that may be referred to herein as a "circuit," "module," "engine", "component," "block", "database", "agent" or "system." Furthermore, aspects of the present disclosure may take the form of a computer program product embodied in one or more non-ephemeral computer readable media having computer readable and/or executable program code embodied thereon.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" (also referred to as an "engine") may constitute a software application but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines, and an implementation, which may be typically private (accessible only to that module) and which includes source code that actually implements the routines in the module. The term module may also simply refer to an application, such as a computer program designed to assist in the performance of a specific task, such as word processing, accounting, inventory management, etc.

In some example embodiments, the term "module" can also refer to a modular hardware component or a component that is a combination of hardware and software. It should be appreciated that implementation and processing of such modules according to the approach described herein can lead to improvements in processing speed and in energy savings and efficiencies in a data-processing system such as, for example, the printing system 200 shown in FIG. 13 and/or the DFE controller 300 shown in FIG. 14. A "module" can perform the various steps, operations or instructions discussed herein, such as the steps or operations discussed herein with respect to FIG. 12 and elsewhere herein.

The method 100 shown in FIG. 12, for example, may be implemented, in part, in a computer program product comprising a module that may be executed by, for example, the DFE controller 220 (or the DFE 300 of FIG. 14). The computer program product may comprise a non-transitory computer-readable recording medium on which a control program can be recorded (e.g., stored), such as a disk, hard drive, or the like. Note that the term 'recording medium' as utilized herein can relate to such a non-transitory computer-readable recording medium.

Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the DFE controller 220 (for example, an internal hard drive of RAM), or may be separate (for example, an external hard drive operatively connected with the printer), or may be separate and accessed via a digital data network such as a local area network (LAN) or the Internet (e.g., as a redundant array of inexpensive or independent disks (RAID) or other network server storage that can be indirectly accessed by the DFE controller 220, via a digital network such as the network 260 shown in FIG. 13).

It is understood that the specific order or hierarchy of steps, operations, or instructions in the processes or methods disclosed is an illustration of exemplary approaches. For example, the various steps, operations or instructions discussed herein can be performed in a different order. Similarly, the various steps and operations of the disclosed examples discussed herein can be varied and processed in a different order. Based upon design preferences, it is understood that the specific order or hierarchy of such steps, operation or instructions in the processes or methods discussed and illustrated herein may be rearranged. The accompanying claims, for example, present elements of the various steps, operations or instructions in a sample order, and are not meant to be limited to the specific order or hierarchy presented.

The inventor has realized a non-abstract technical solution to the technical problem to improve a computer-technology by improving efficiencies in such computer technology. The disclosed embodiments offer technical improvements to a computer-technology such as a data-processing system, and further provide for a non-abstract improvement to a computer technology via a technical solution to the technical problem(s) identified in the background section of this disclosure. Such improvements can result from implementations of the embodiments. The claimed solution may be rooted in computer technology in order to overcome a problem specifically arising in the realm of computers, computer networks, and printing and scanning. The claimed solution may also involve non-abstract devices such as security devices including non-abstract features such as printed media (e.g., paper) upon which a security device (e.g., a watermark) may be rendered.

Based on the foregoing, it can be appreciated that different embodiments are disclosed. For example, in an embodiment, a method for generating pre-trapped text, can involve: a color comprising at least two inks; writing a character of microtext in a normal position using at least one of the at least two inks; writing the character n more times in the color at new positions; and altering the color and writing the character in microtext in the normal position.

An embodiment can further involve performing a color calibration of the color.

An embodiment may also involve performing a color calibration of the color prior to writing the character of microtext in the normal position using the at least one of the at least two inks.

An embodiment can further involve measuring a color-to-color registration error after performing a color calibration.

An embodiment can also involve remeasuring the color-to-color registration error after a period of time.

An embodiment can further involve measuring a color-to-color registration error after performing a color calibration and prior to writing the character of microtext in the normal position using the at least one of the at least two inks.

In an embodiment, a system for rendering pre-trapped text on a recording medium, can include a processor; and a computer-readable medium containing programming instructions that are configured to cause the processor to: provide a color comprising at least two inks; write a character of microtext in a normal position using at least one of the at least two inks; write the character n more times in the color at new positions; alter the color and write the character in microtext in the normal position.

In an embodiment, the instructions can be further configured to cause the processor to perform a color calibration of the color.

In an embodiment, the instructions can be further configured to cause the processor to write the character of microtext in the normal position using the at least one of the at least two inks.

In an embodiment, the instructions can be further configured to cause the processor to measure a color-to-color registration error after performing a color calibration.

In an embodiment, the instructions can be further configured to cause the processor to remeasure the color-to-color registration error after a period of time.

In an embodiment, the instructions can be further configured to cause the processor to measure a color-to-color registration error after performing a color calibration and prior to writing the character of microtext in the normal position using the at least one of the at least two inks.

In an embodiment, a printing system can include a print device, a processor, and a computer-readable medium containing programming instructions that are configured to cause the processor to: provide a color comprising at least two inks; write a character of microtext in a normal position using at least one of the at least two inks; write the character n more times in the color at new positions; alter the color and write the character in microtext in the normal position; and cause the print device to render the microtext on a recording medium.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for generating pre-trapped text, comprising:
   providing a color comprising at least two inks;
   writing a character of microtext in a normal position using at least one of the at least two inks;

measuring a color-to-color registration error after performing a color calibration of the color;

writing the character n more times in the color at new positions; and altering the color and writing the character in microtext in the normal position.

2. The method of claim 1 further comprising performing the color calibration of the color.

3. The method of claim 1 further comprising performing the color calibration of the color prior to writing the character of microtext in the normal position using the at least one of the at least two inks.

4. The method of claim 1 further comprising remeasuring the color-to-color registration error after a period of time.

5. The method of claim 1 further comprising:

measuring the color-to-color registration error after performing the color calibration and prior to writing the character of microtext in the normal position using the at least one of the at least two inks.

6. The method of claim 5 further comprising remeasuring the color-to-color registration error after a period of time.

7. A system for rendering pre-trapped text on a recording medium, comprising:

a processor; and a computer-readable medium containing programming instructions that are configured to cause the processor to:

provide a color comprising at least two inks;

write a character of microtext in a normal position using at least one of the at least two inks;

measure a color-to-color registration error after performing a color calibration of the color;

write the character n more times in the color at new positions;

alter the color and write the character in microtext in the normal position.

8. The system of claim 7 wherein the instructions are further configured to cause the processor to perform the color calibration of the color.

9. The system of claim 7 wherein the instructions are further configured to cause the processor to write the character of microtext in the normal position using the at least one of the at least two inks.

10. The system of claim 7 wherein the instructions are further configured to cause the processor to remeasure the color-to-color registration error after a period of time.

11. The system of claim 7 wherein the instructions are further configured to cause the processor to measure the color-to-color registration error after performing the color calibration and prior to writing the character of microtext in the normal position using the at least one of the at least two inks.

12. The system of claim 11 wherein the instructions are further configured to cause the processor to remeasure the color-to-color registration error after a period of time.

13. A printing system, comprising:

a print device;

a processor; and a computer-readable medium containing programming instructions that are configured to cause the processor to:

provide a color comprising at least two inks;

write a character of microtext in a normal position using at least one of the at least two inks;

measure a color-to-color registration error after performing a color calibration of the color;

write the character n more times in the color at new positions;

alter the color and write the character in microtext in the normal position; and cause the print device to render the microtext on a recording medium.

14. The printing system of claim 13 wherein the instructions are further configured to cause the processor to perform the color calibration of the color.

15. The printing system of claim 13 wherein the instructions are further configured to cause the processor to write the character of microtext in the normal position using the at least one of the at least two inks.

16. The printing system of claim 13 wherein the instructions are further configured to cause the processor to remeasure the color-to-color registration error after a period of time.

17. The printing system of claim 13 wherein the instructions are further configured to cause the processor to measure a color-to-color registration error after performing a color calibration and prior to writing the character of microtext in the normal position using the at least one of the at least two inks.

18. The printing system of claim 13 further comprising a digital front end (DFE) comprising the processor.

19. The printing system of claim 18 wherein the DFE comprises a DFE controller.

20. The printing system of claim 13 wherein the microtext is rendered on the recording medium as part of a security application.

* * * * *